(12) United States Patent
Lin

(10) Patent No.: US 12,177,909 B2
(45) Date of Patent: *Dec. 24, 2024

(54) METHOD AND APPARATUS FOR RANDOM ACCESS

(71) Applicant: Telefonaktiebolaget LM Ericsson (publ), Stockholm (SE)

(72) Inventor: Zhipeng Lin, Nanjing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 18/231,493

(22) Filed: Aug. 8, 2023

(65) Prior Publication Data

US 2024/0049303 A1    Feb. 8, 2024

Related U.S. Application Data

(63) Continuation of application No. 17/797,514, filed as application No. PCT/CN2021/074110 on Jan. 28, 2021, now Pat. No. 11,864,246.

(30) Foreign Application Priority Data

Feb. 7, 2020   (WO) ................ PCT/CN2020/074528

(51) Int. Cl.
*H04W 72/23*     (2023.01)
*H04L 5/00*     (2006.01)
*H04W 74/0833*  (2024.01)

(52) U.S. Cl.
CPC ......... *H04W 74/085* (2013.01); *H04L 5/0062* (2013.01); *H04L 5/0091* (2013.01); *H04W 72/23* (2023.01)

(58) Field of Classification Search
CPC ........... H04W 74/006; H04W 74/0833; H04W 74/085; H04W 74/02; H04W 72/23;
(Continued)

(56) References Cited

U.S. PATENT DOCUMENTS 11,419,145 B2 *  8/2022  Agiwal ................ H04W 74/02
2009/0286563 A1  11/2009  Ji et al.
(Continued)

FOREIGN PATENT DOCUMENTS

CN      110603760 A     12/2019
CN      110740516 A      1/2020

OTHER PUBLICATIONS

Author Unknown, "Technical Specification Group Radio Access Network; NR; Physical layer procedures for data (Release 16)," Technical Specification 38.214, Version 16.0.0, Dec. 2019, 3GPP Organizational Partners, 147 pages.
(Continued)

*Primary Examiner* — Wei Zhao
(74) *Attorney, Agent, or Firm* — Withrow & Terranova, PLLC

(57) ABSTRACT

Various embodiments of the present disclosure provide a method for random access. The method which may be performed by a terminal device comprises determining an interlace configuration for uplink shared channel transmission to a network node in a two-step contention-free random access procedure. The method further comprises performing the uplink shared channel transmission to the network node in the two-step contention-free random access procedure, according to the determined interlace configuration. According to some embodiments of the present disclosure, the interlaced resource allocation for uplink shared channel transmission may be configured for a two-step contention-free random access procedure in a flexible and efficient way, (Continued)

so that the performance of the random access procedure can be improved.

20 Claims, 11 Drawing Sheets

(58) Field of Classification Search
CPC ..... H04W 76/27; H04W 76/36; H04W 76/19; H04L 5/0062; H04L 5/0091; H04L 5/0048
See application file for complete search history.

(56) References Cited

U.S. PATENT DOCUMENTS

| | | | |
|---|---|---|---|
| 2013/0294318 A1* | 11/2013 | Amerga | H04W 4/06 370/312 |
| 2019/0110307 A1 | 4/2019 | Kim et al. | |
| 2019/0349968 A1 | 11/2019 | Yerramalli et al. | |
| 2021/0045105 A1* | 2/2021 | Yoon | H04L 1/1812 |

OTHER PUBLICATIONS

Ericsson, "R2-1912681: 2-step CFRA," 3GPP TSG-RAN WG2 RAN2#107bis, Oct. 14-18, 2019, Chongqing, China, 7 pages.

Huawei, et al., "R2-1913008: Discussion on the msgA transmission," 3GPP TSG-RAN WG2 #107bis, Oct. 14-18, 2019, Chongqing, China, 6 pages.

ZTE, et al., "R1-1910002: Remaining issues of msgA channel structure," 3GPP TSG RAN WG1 #98bis, Oct. 14-20, 2019, Chongqing, China, 26 pages.

ZTE, "R1-1913568: FL Summary #5 of Channel Structure for 2-step RACH," 3GPP TSG RAN WG1 #99, Nov. 18-22, 2019, Reno, Nevada, 35 pages.

ZTE Corporation, et al., "R2-1914800: Support of CFRA with 2-step RACH," 3GPP TSG-RAN2 Meeting #108, Nov. 18-22, 2019, Reno, Nevada, 8 pages.

ZTE Corporation, et al., "R2-1915268: Draft MAC CR for 2-step CFRA," 3GPP TSG-RAN WG2 Meeting #108, Nov. 18-22, 2019, Reno, Nevada, 39 pages.

ZTE Corporation, et al., "RP-182894: New work item: 2-step RACH for NR," 3GPP TSG RAN Meeting #82, Dec. 10-13, 2018, Sorrento, Italy, 5 pages.

ZTE Corporation, "RP-192330: Revised work item proposal: 2-step RACH for NR," 3GPP TSG RAN Meeting #85, Sep. 16-20, 2019, Newport Beach, California, 4 pages.

Extended European Search Report for European Patent Application No. 21751261.5, mailed Jun. 7, 2023, 12 pages.

Office Action for Taiwanese Patent Application No. 110104381, mailed Dec. 28, 2021, 42 pages.

International Search Report and Written Opinion for International Patent Application No. PCT/CN2021/074110, mailed Apr. 22, 2021, 10 pages.

Ex Parte Quayle Action for U.S. Appl. No. 17/797,514, mailed Feb. 2, 2023, 10 pages.

Notice of Allowance for U.S. Appl. No. 17/797,514, mailed May 17, 2023, 10 pages.

* cited by examiner

METHOD AND APPARATUS FOR RANDOM ACCESS

This application is a continuation of U.S. patent application Ser. No. 17/797,514, filed Aug. 4, 2022, which is a 35 U.S.C. § 371 national phase filing of International Application No. PCT/CN2021/074110, filed Jan. 28, 2021, which claims the benefit of International Application No. PCT/CN2020/074528, filed Feb. 7, 2020, the disclosures of which are incorporated herein by reference in their entireties.

FIELD OF THE INVENTION

The present disclosure generally relates to communication networks, and more specifically, to a method and apparatus for random access.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate with lower latency. In order to connect to a network node, a random access (RA) procedure may be initiated for a terminal device. In the RA procedure, system information (SI) and synchronization signals (SS) as well as the related radio resource and transmission configuration can be informed to the terminal device by signaling messages from the network node. The RA procedure can enable the terminal device to establish a session for a specific service with the network node.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A wireless communication network such as a NR/5G network may be able to support flexible network configuration. Different signaling approaches (e.g., a four-step approach, a two-step approach, etc.) may be used for a RA procedure of a terminal device to set up a connection with a network node. In the RA procedure, the terminal device may perform a RA preamble transmission and a physical uplink shared channel (PUSCH) transmission to the network node in different messages (e.g., in message 1/msg1 and message 3/msg3 for four-step RA, respectively) or in the same message (e.g., in message A/msgA for two-step RA). The RA preamble may be transmitted in a time-frequency physical random access channel (PRACH) occasion (which is also known as a RA occasion, RACH occasion, or RO for short). The PUSCH transmission may occur in a PUSCH occasion (PO) configured with one or more demodulation reference signal (DMRS) resources. The PO may consist of time-frequency radio resources allocated for the PUSCH transmission. In some cases, the time-frequency radio resource allocation may be configured in an interlaced way. Configurations of the interlaced resource allocation for PUSCH may need to be adapted to different RA procedures, e.g. contention-based random access (CBRA) and contention-free random access (CFRA). However, there is no existing scheme for configuring the interlaced resource allocation for msgA PUSCH in CFRA. Therefore, it may be desirable to implement configuration of the interlaced resource allocation for msgA PUSCH in CFRA efficiently.

Various embodiments of the present disclosure propose a solution for RA, which can enable msgA PUSCH transmission from a terminal device to a network node in a CFRA procedure to be configured with interlaced resource allocation, for example, by dedicated signaling and/or utilizing some of existing information, so as to perform configuration of the interlaced resource allocation for msgA PUSCH in the CFRA procedure in a flexible and efficient way.

It can be appreciated that the terms "four-step RA procedure" and "four-step RACH procedure" mentioned herein may also be referred to as Type-1 random access procedure as defined in the 3rd generation partnership project (3GPP) technical specification (TS) 38.213 V16.0.0, where the entire content of this technical specification is incorporated into the present disclosure by reference. These terms may be used interchangeably in this document.

Similarly, it can be appreciated that the terms "two-step RA procedure" and "two-step RACH procedure" mentioned herein may also be referred to as Type-2 random access procedure as defined in 3GPP TS 38.213 V16.0.0, and these terms may be used interchangeably in this document.

In addition, it can be appreciated that a two-step CFRA procedure described in this document may refer to a contention-free random access procedure in which a terminal device is configured to transmit a msgA to a network node as a first step, and a msgB in response to the msgA is expected to be received from the network node by the terminal device as a second step. It can be appreciated that the term "two-step CFRA" mentioned herein may also be referred to as "CFRA with two-step RA type", and the two terms may be used interchangeably in this document.

It can be realized that the terms "PRACH occasion", "random access channel (RACH) occasion" or "RA occasion" mentioned herein may refer to a time-frequency resource usable for the preamble transmission in a RA procedure, which may also be referred to as "random access occasion (RO)". These terms may be used interchangeably in this document.

Similarly, it can be realized that the terms "PUSCH occasion", "uplink shared channel occasion" or "shared channel occasion" mentioned herein may refer to a time-frequency resource usable for PUSCH transmission in a RA procedure, which may also be referred to as "physical uplink shared channel occasion (PO)". These terms may be used interchangeably in this document.

According to a first aspect of the present disclosure, there is provided a method performed by a terminal device such as a user equipment (UE). The method comprises determining a interlace configuration for uplink shared channel transmission (e.g., msgA PUSCH transmission, etc.) to a network node in a two-step CFRA procedure. In accordance with some exemplary embodiments, the method further comprises performing the uplink shared channel transmission to the network node in the two-step CFRA procedure, according to the determined interlace configuration.

It can be appreciated that the term "interlace configuration" described in this document may refer to a configuration which may indicate to enable or disable the interlaced resource allocation and/or indicate how to implement the interlaced resource allocation. In various exemplary embodiments, the term "interlace configuration" and the term "configuration of the interlaced resource allocation" may be used interchangeably.

In accordance with some exemplary embodiments, the determination of the interlace configuration may be based at least in part on dedicated signaling for the two-step CFRA procedure from the network node.

In accordance with some exemplary embodiments, the dedicated signaling may include one or more of:
- a start interlace index for an interlace or a set of interlaces allocated for the uplink shared channel transmission;
- a number of consecutive interlaces allocated for the uplink shared channel transmission; and
- a dedicated flag indicating whether to enable interlaced resource allocation for the uplink shared channel transmission in the two-step CFRA procedure.

In accordance with some exemplary embodiments, the dedicated signaling may include a specific field with a number of bits to indicate frequency resource allocation for the uplink shared channel transmission in the two-step CFRA procedure.

In accordance with some exemplary embodiments, the number of bits may be related to a size of an active uplink (UL) bandwidth part (BWP).

In accordance with some exemplary embodiments, the number of bits may be a fixed number.

In accordance with some exemplary embodiments, the determination of the interlace configuration may be based at least in part on common signaling from the network node. The common signaling may indicate whether to enable interlaced resource allocation for the uplink shared channel transmission.

In accordance with some exemplary embodiments, the determination of the interlace configuration may be performed by the terminal device based at least in part on one or more of:
- first configuration information, which may be related to a interlace configuration for uplink shared channel transmission of the terminal device in a two-step CBRA procedure; and
- second configuration information, which may be related to a interlace configuration for uplink shared channel transmission of the terminal device with configured grant based scheduling.

In accordance with some exemplary embodiments, the first configuration information may be indicated by higher layer signaling (e.g., radio resource control (RRC) signaling, etc.) from the network node.

In accordance with some exemplary embodiments, the first configuration information may be predetermined.

In accordance with some exemplary embodiments, the determination of the interlace configuration may be based at least in part on one or more of the following messages from the network node:
- a handover command message;
- a beam failure recover message; and
- a downlink control channel order for the two-step CFRA procedure.

According to a second aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a terminal device. The apparatus comprises a determining unit and a performing unit. In accordance with some exemplary embodiments, the determining unit is operable to carry out at least the determining step of the method according to the first aspect of the present disclosure. The performing unit is operable to carry out at least the performing step of the method according to the first aspect of the present disclosure. In an embodiment, the performing unit may be implemented as a transmitting unit to carry out at least the step of performing the uplink shared channel transmission in the method according to the first aspect of the present disclosure.

According to a fifth aspect of the present disclosure, there is provided a method performed by a network node such as a base station. The method comprises determining a interlace configuration for uplink shared channel transmission of a terminal device in a two-step CFRA procedure. In accordance with some exemplary embodiments, the method further comprises receiving the uplink shared channel transmission from the terminal device in the two-step CFRA procedure, according to the determined interlace configuration.

In accordance with some exemplary embodiments, the interlace configuration for uplink shared channel transmission according to the fifth aspect of the present disclosure may correspond to the interlace configuration for uplink shared channel transmission according to the first aspect of the present disclosure. Thus, the interlace configuration for uplink shared channel transmission according to the first and fifth aspects of the present disclosure may have the same or similar contents and/or feature elements.

In accordance with some exemplary embodiments, the method according to the fifth aspect of the present disclosure may further comprise: transmitting dedicated signaling to the terminal device to indicate the determined interlace configuration.

In accordance with some exemplary embodiments, the dedicated signaling according to the fifth aspect of the present disclosure may correspond to the dedicated signaling according to the first aspect of the present disclosure, and thus may have the same or similar contents and/or feature elements.

In accordance with some exemplary embodiments, the method according to the fifth aspect of the present disclosure may further comprise: transmitting common signaling to the terminal device to indicate whether to enable interlaced resource allocation for the uplink shared channel transmission.

In accordance with some exemplary embodiments, the determination of the interlace configuration may be performed by the network node based at least in part on first configuration information related to CBRA configuration (e.g., the first configuration information according to the first aspect of the present disclosure) and/or second configuration information related to configured grant based scheduling (e.g., the second configuration information according to the first aspect of the present disclosure).

In accordance with some exemplary embodiments, the method according to the fifth aspect of the present disclosure may further comprise: transmitting higher layer signaling (e.g., RRC signaling, etc.) to the terminal device to indicate the first configuration information. It can be appreciated that the first configuration information may be predetermined.

In accordance with some exemplary embodiments, the method according to the fifth aspect of the present disclosure may further comprise: indicating the determined interlace configuration to the terminal device in one or more of the following messages:
  a handover command message;
  a beam failure recover message; and
  a downlink control channel order for the two-step CFRA procedure.

According to a sixth aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a network node. The apparatus comprises a determining unit and a receiving unit. In accordance with some exemplary embodiments, the determining unit is operable to carry out at least the determining step of the method according to the fifth aspect of the present disclosure. The receiving unit is operable to carry out at least the receiving step of the method according to the fifth aspect of the present disclosure.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the fifth aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the fifth aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the first aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the first aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the first aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the first aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the fifth aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the fifth aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which.

DETAILED DESCRIPTION

Figure 1:
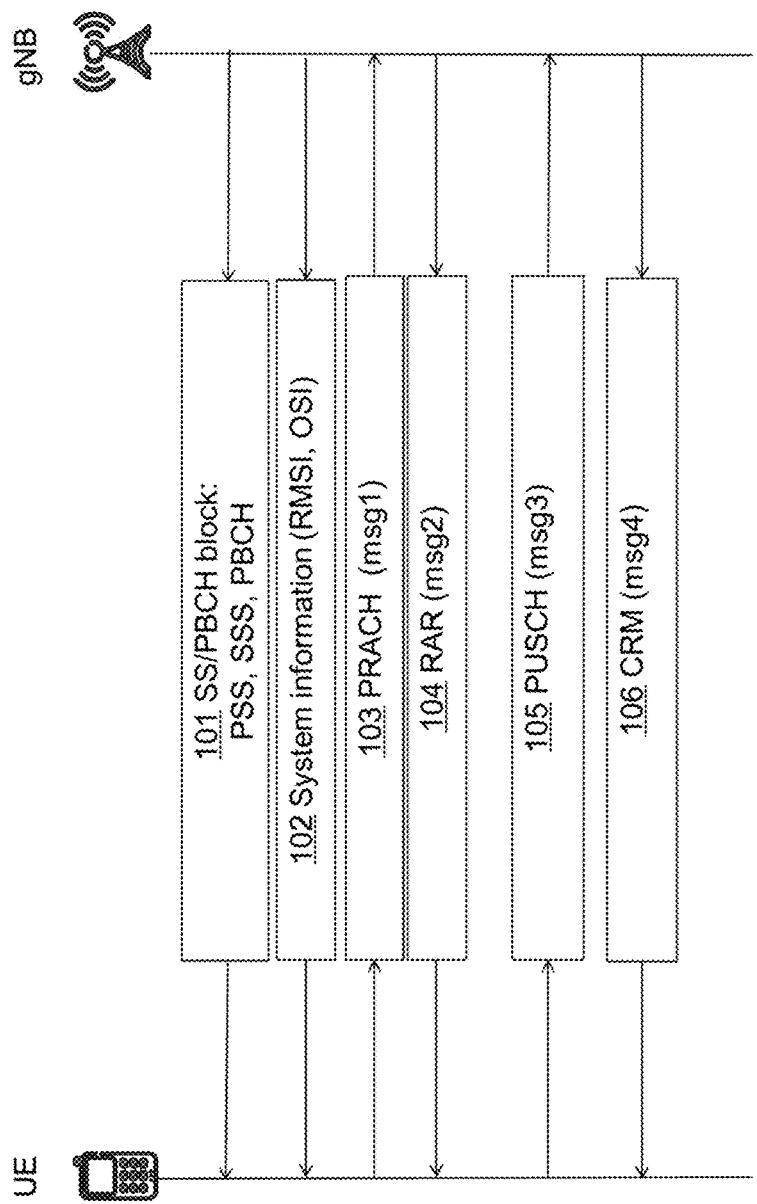
FIG. 1 is a diagram illustrating an exemplary four-step RA procedure according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. As described previously, in order to connect to a network node such as a gNB in a wireless communication network, a terminal device such as a UE may need to perform a RA procedure to exchange essential information and messages for communication link establishment with the network node.

FIG. 1 is a diagram illustrating an exemplary four-step RA procedure according to an embodiment of the present disclosure. As shown in FIG. 1, a UE can detect a synchronization signal (SS) by receiving 101 an SSB (e.g., a primary synchronization signal (PSS), a secondary synchronization signal (SSS), and physical broadcast channel (PBCH)) from a gNB in a NR system. The UE can decode 102 some system information (e.g., remaining minimum system information (RMSI) and other system information (OSI)) broadcasted in the downlink (DL). Then the UE can transmit 103 a PRACH preamble (message 1/msg1) in the uplink (UL). The gNB can reply 104 with a random access response (RAR, message 2/msg2). In response to the RAR, the UE can transmit 105 the UE's identification information (message 3/msg3) on PUSCH. Then the gNB can send 106 a contention resolution message (CRM, message 4/msg4) to the UE.

In the exemplary procedure, the UE transmits message 3/msg3 on PUSCH after receiving a timing advance command in the RAR, allowing message 3/msg3 on PUSCH to be received with timing accuracy within a cyclic prefix (CP). Without this timing advance, a very large CP may be needed in order to be able to demodulate and detect message3/msg3 on PUSCH, unless the communication system is applied in a cell with very small distance between the UE and the gNB. Since the NR system can also support larger cells with a need for providing a timing advance command to the UE, the four-step approach is needed for the RA procedure.

Figure 2A:
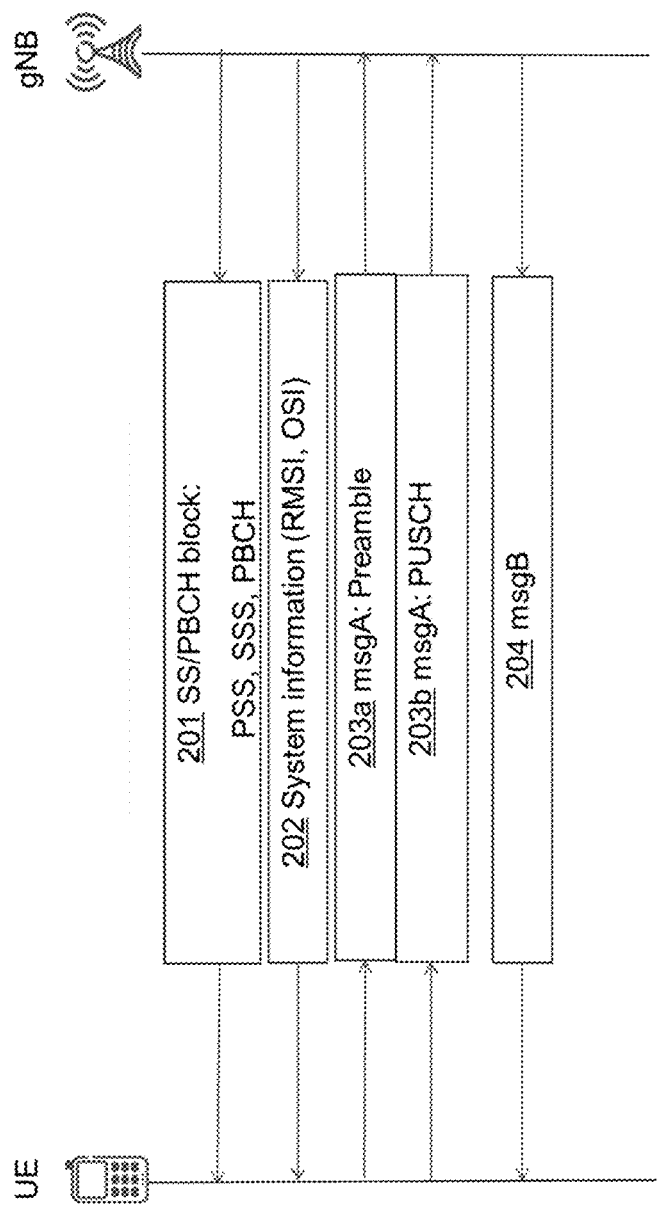
FIG. 2A is a diagram illustrating an exemplary two-step RA procedure according to an embodiment of the present disclosure.

FIG. 2A is a diagram illustrating an exemplary two-step RA procedure according to an embodiment of the present disclosure. Similar to the procedure as shown in FIG. 1, in the procedure shown in FIG. 2A, a UE can detect a SS by receiving 201 an SSB (e.g., comprising a PSS, a SSS and PBCH) from a gNB in a NR system, and decode 202 system information (e.g., RMSI and OSI) broadcasted in the DL. Compared to the four-step approach as shown in FIG. 1, the UE performing the procedure in FIG. 2A can complete random access in only two steps. Firstly, the UE sends 203a/203b to the gNB a message A (msgA) including RA preamble together with higher layer data such as a radio resource control (RRC) connection request possibly with some payload on PUSCH. Secondly, the gNB sends 204 to the UE a RAR (also called message B or msgB) including UE identifier assignment, timing advance information, a contention resolution message, and etc. It can be seen that there may be no explicit grant from msgB for PUSCH in msgA as the msgB is after msgA.

In the two-step RA procedure, the preamble and msgA PUSCH can be transmitted by the UE in one message called message A. For transmission of msgA PUSCH, i.e. the PUSCH part of msgA, the notion of a PUSCH resource unit may be introduced, where a PUSCH resource unit may consist of time-frequency radio resources of transmission and DMRS sequence configuration. Two simultaneous msgA PUSCH transmissions can be distinguished by the receiver according to different PUSCH resource units used for the two msgA PUSCH transmissions. The notion of PUSCH occasion also may be introduced, where a PUSCH occasion may consist of time-frequency radio resources for the transmission of msgA PUSCH.

In accordance with some exemplary embodiments, a RA procedure such as two-step RACH and four-step RACH can be performed in two different ways, e.g., contention-based (CBRA) and contention-free (CFRA). The difference is in that which preamble is used. In the contention-based case, a UE may randomly select a preamble from a range of preambles. For this case, there may be a collision if two UEs select the same preamble. In the contention-free case, a UE may be given a specific preamble by the network, which ensures that two UEs will not select the same preamble, thus the RA is collision-free. The CBRA may be typically used when a UE is in an idle/inactive state and wants to go to the connected state, while the CFRA may be used for performing handover and/or in beam failure procedures.

Figure 2B:
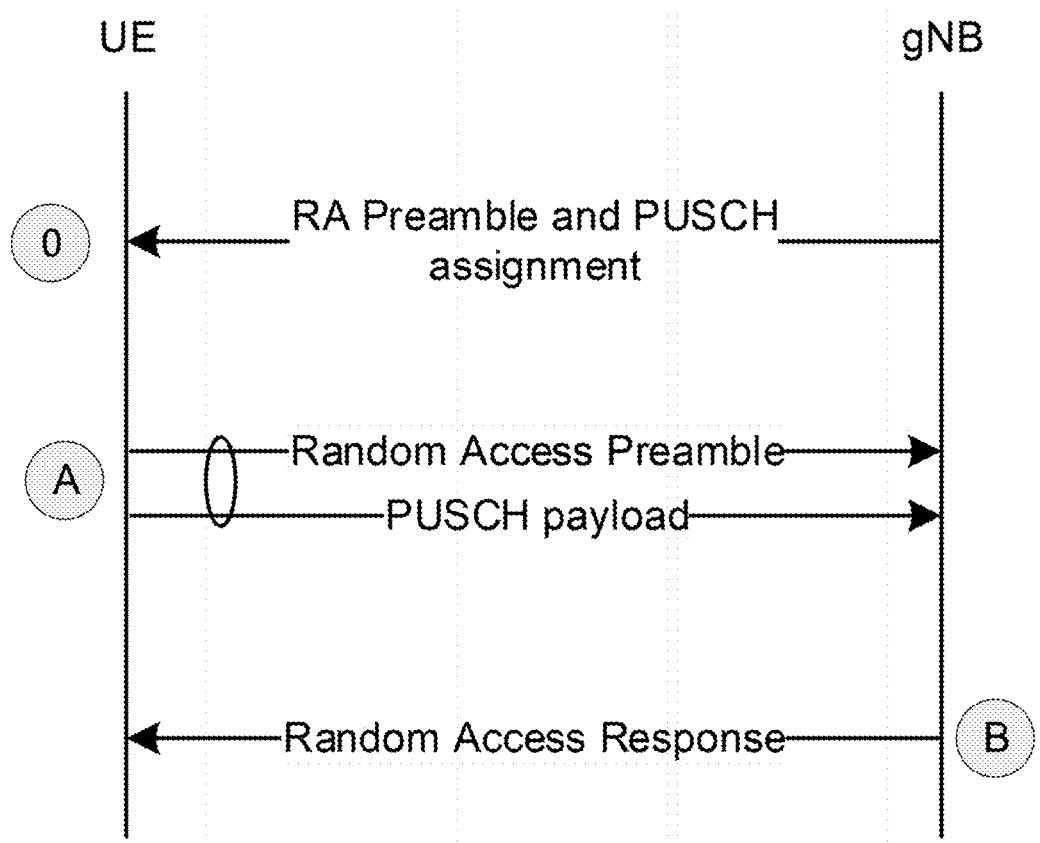
FIG. 2B is a diagram illustrating exemplary CFRA with two-step RA type according to an embodiment of the present disclosure.

FIG. 2B is a diagram illustrating exemplary CFRA with two-step RA type according to an embodiment of the present disclosure. The procedure illustrated in FIG. 2B may also be referred to as a two-step CFRA procedure. As shown in FIG. 2B, in the case of CFRA with two-step RA type, a UE may receive a RA preamble and PUSCH assignment from a gNB in step 0, prior to transmitting msgA (including RA preamble and PUSCH payload) to the gNB in step A and receiving msgB (RAR) from the gNB in step B.

In accordance with some exemplary embodiments, interlaced resource allocation may be configured for communications between a network node and a terminal device. As described in 3GPP TS 38.211 V16.0.0, where the entire content of this technical specification is incorporated into the present disclosure by reference, interlaced resource blocks may be defined depending on the subcarrier spacing (SCS) $\mu$ configured for an active UL bandwidth part (BWP). As an example, multiple orthogonal frequency division multiplex (OFDM) numerologies may be supported as given by Table 1, where $\Delta f$ indicates SCS in kHz, $\mu$ and the cyclic prefix for a BWP may be obtained from the higher-layer parameter subcarrierSpacing and cyclicPrefix, respectively.

TABLE 1

| $\mu$ | $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In accordance with an exemplary embodiment, multiple interlaces of resource blocks may be defined as described in 3GPP TS 38.211 V16.0.0, where interlace $m \in \{0, 1, \ldots, M-1\}$ consists of common resource blocks $\{m, M+m, 2M+m, 3M+m, \ldots\}$, with M being the number of interlaces given by Table 2.

TABLE 2

| $\mu$ | M |
|---|---|
| 0 | 10 |
| 1 | 5 |

Table 2 shows the number of resource block interlaces M corresponding to parameter µ, where µ=0 means 15 kHz SCS and µ=1 means 30 kHz SCS.

The relation between the interlaced resource block $n_{IRB,m}^{\mu} \in \{0, 1, \ldots\}$ in BWP i and interlace m and the common resource block $n_{CRB}^{\mu}$ may be given by the following formula:

$$n_{CRB}^{\mu} = M n_{IRB,m}^{\mu} + N_{BWP,i}^{start,\mu} + ((m - N_{BWP,i}^{start,\mu}) \bmod M) \quad (1)$$

where $N_{BWP,i}^{start,\mu}$ is the common resource block where the BWP starts relative to common resource block 0. If there is no risk for confusion, the index µ may be dropped.

In accordance with some exemplary embodiments, interlaced resource allocation may be configured for msg3 transmission and normal PUSCH transmission (e.g., dynamic grant scheduled PUSCH). For msg3 and normal PUSCH, the useInterlacePUSCH-Common parameter may be used to determine whether the frequency domain resource allocation is configured in an interlaced way or not, so as to determine whether to implement interlaced msg3 PUSCH and interlaced normal PUSCH. In the case that this parameter is provided, UL resource allocation type 2 as described in section 6.1.2.2.3 in 3GPP TS 38.214 V16.0.0 may be applied, where the entire content of this technical specification is incorporated into the present disclosure by reference.

According to an exemplary embodiment for msg3, a 12-bit field in RAR may be provided for the interlaced frequency domain resource allocation. The exemplary RAR grant content field size is given in Table 3.

As described with respect to FIG. 2A and FIG. 2B, in a two-step RA procedure, the preamble and msgA PUSCH may be transmitted by a UE in one message called message A. In accordance with an exemplary embodiment, the msgA PUSCH resource allocation for CFRA may be defined in dedicated signaling. For example, the PUSCH resource for two-step CFRA associated with the dedicated preamble may be configured to a UE via the dedicated signaling. In this case, the msgA PUSCH resource allocation for CFRA may not be included in system information block type 1 (SIB1).

Various exemplary embodiments of the present disclosure propose a solution for RA, which can enable the interlaced msgA PUSCH in a two-step CFRA procedure. According to the proposed solution, the interlaced resource allocation may be configured for msgA PUSCH transmission in CFRA. In accordance with some exemplary embodiments, the configuration of interlaced resource allocation for msgA PUSCH transmission in CFRA may be provided at least partly by dedicated signaling. Alternatively or additionally, the configuration of interlaced resource allocation for msgA PUSCH transmission in CFRA may be provided at least partly by common signaling for the interlaced PUSCH resource. In accordance with some exemplary embodiments, some of existing signaling or parameters for interlaced resource configuration may be utilized or reused to configure the interlaced resource allocation for msgA PUSCH transmission in CFRA. In this way, the configuration of interlaced msgA PUSCH in the two-step CFRA procedure may be performed with enhanced resource utilization and improved transmission efficiency and flexibility.

TABLE 3

| RAR grant field | Number of bits |
| --- | --- |
| Frequency hopping flag | 1 |
| PUSCH frequency resource allocation | 14, for operation without shared spectrum channel access<br>12, for operation with shared spectrum channel access |
| PUSCH time resource allocation | 4 |
| MCS | 4 |
| TPC command for PUSCH | 3 |
| CSI request | 1 |
| ChannelAccess-CPext | 0, for operation without shared spectrum channel access<br>2, for operation with shared spectrum channel access |

As shown in Table 3, the 12-bit field "PUSCH frequency resource allocation" may be used for operation with shared spectrum channel access (e.g., unlicensed band, etc.).

For normal PUSCH dynamically scheduled by downlink control information (DCI), $\lceil \log_2(N_{RB}^{UL,BWP}(N_{RB}^{UL,BWP}+1)/2) \rceil$ bits may provide the frequency domain resource allocation as described in section 6.1.2.2.2 of 3GPP TS 38.214 V16.0.0, where $N_{RB}^{UL,BWP}$ is the size of the initial or active UL BWP.

In accordance with an exemplary embodiment for msgA PUSCH in a two-step CBRA procedure, the interlaced msgA PUSCH may be configured per msgA PUSCH configuration per BWP as described in section 8.1A of 3GPP TS 38.213 V16.0.0. For example, a UE may determine a first interlace or first resource block (RB) for a first PUSCH occasion in an active UL BWP respectively from the parameter interlaceIndexFirstPOMsgAPUSCH or from the parameter frequencyStartMsgAPUSCH that provides an offset, in number of RBs in the active UL BWP, from a first RB of the active UL BWP. A PUSCH occasion may include a number of interlaces or a number of RBs provided by the parameter nrofInterlacesPerMsgAPO or by the parameter nrofPRBsperMsgAPO, respectively.

In accordance with some exemplary embodiments, at least part of configuration of interlaced msgA PUSCH (also called "the interlaced msgA PUSCH configuration", or "interlace configuration" for short) may be provided in the dedicated signaling for a two-step CFRA procedure. According to an exemplary embodiment, the interlace configuration may be explicitly provided by one or more of the following elements in the dedicated signaling:

the start interlace index for an interlace or a set of interlaces allocated for the PUSCH transmission (e.g., the start interlace index for the first interlace allocated for the PUSCH transmission);
  the number of consecutive interlaces allocated for the msgA PUSCH transmission; and
  the dedicated interlace on-off flag (e.g., using a specific parameter such as useInterlaceMsgAPUSCH-Dedicated, if this parameter is provided and/or set to a first value such as "1", the interlaced msgA PUSCH resource allocation is enabled; and if this parameter is set to a second value such as "0" or the parameter is not provided, non-interlaced msgA PUSCH resource allocation is used).

In accordance with some exemplary embodiments, the common interlace enabling signaling (e.g. the existing signaling useInterlacePUSCH-Common, etc.) may be utilized or reused to indicate at least part of the configuration of interlaced msgA PUSCH. As an example, two parameters interlaceIndexFirst InterlaceMsgAPUSCHCFRA and nrofInterlacesMsgAPUSCHCFRA as shown in Table 4 may be provided in a specific information element (IE) such as RACH-ConfigDedicated IE for the interlace configuration of msgA PUSCH, in the case that the signaling useInterlacePUSCH-Common is provided.

TABLE 4

| Parameter | Description | Value |
| --- | --- | --- |
| interlaceIndexFirstInterlaceMsgAPUSCHCFRA | Interlace index of the first interlace for the msgA PUSCH in frequency domain if interlaced msgA PUSCH in CFRA is enabled. | INTEGER {1 . . . 10} for 15 kHz SCS, INTEGER {1 . . . 5} for 30 kHz SCS |
| nrofInterlacesMsgAPUSCHCFRA | Number of consecutive interlaces of the msgA PUSCH if interlaced msgA PUSCH in CFRA is enabled. | INTEGER {1 . . . 10} for 15 kHz SCS, INTEGER {1 . . . 5} for 30 kHz SCS |

In accordance with some exemplary embodiments, the dedicated interlace on-off flag (e.g., useInterlaceMsgA-PUSCH-Dedicated, etc.) may be used to override the common interlace enabling flag (e.g., useInterlacePUSCH-Common, etc.). For example, if the dedicated interlace on-off flag indicates to enable the interlace configuration of msgA PUSCH for a specific UE, then the interlaced msgA PUSCH resource allocation may be implemented for this UE, regardless of whether the common interlace enabling flag indicates to enable or disable the interlace configuration. In the case that the dedicated interlace on-off flag for the UE indicates to disable the interlace configuration of msgA PUSCH, then the interlaced msgA PUSCH resource allocation may not be applied for the UE, even though the common interlace enabling flag indicates to enable the interlace configuration.

In accordance with some exemplary embodiments, the interlace configuration may be determined by a number of bits for frequency domain resource allocation, e.g., in the dedicated signaling or other suitable signaling/messages. According to an exemplary embodiment, the number of bits may be used to determine the frequency domain resource allocation of msgA PUSCH in two-step CFRA in the case that the interlaced PUSCH is enabled, according to the procedure as described in section 6.1.2.2.3 in 3GPP TS 38.214 V16.0.0. In an embodiment, the "number of bits" may be related to at least the active UL BWP size. In another embodiment, the "number of bits" may be a fixed number, e.g. 12 bits.

According to an exemplary embodiment, a specific field such as $\lceil \log_2(N_{RB}^{UL,BWP}(N_{RB}^{UL,BWP}+1)/2) \rceil$ bit-field "PUSCH frequency resource allocation" may be provided in an IE (e.g., RACH-ConfigDedicated or other proper IEs in the dedicated signaling) for the interlace configuration of msgA PUSCH, in the case that useInterlacePUSCH-Common is provided to enable the interlaced PUSCH, where $N_{RB}^{UL,BWP}$ is the size of the initial or active UL BWP. The specific field may be used to determine the frequency domain resource allocation of msgA PUSCH in two-step CFRA, for example, according to the procedure described in section 6.1.2.2.3 in 3GPP TS 38.214 V16.0.0.

In accordance with some exemplary embodiments, the interlaced msgA PUSCH configuration for CFRA may be implemented by utilizing or reusing one of the interlace configurations of msgA PUSCH for CBRA. In an exemplary embodiment, first configuration information related to the reused interlace configuration of msgA PUSCH for CBRA may indicate which one of the interlace configurations of msgA PUSCH for CBRA may be selected for msgA PUSCH in CFRA. Alternatively or additionally, the first configuration information may indicate which PO in the set of POs configured for msgA PUSCH in CBRA may be selected for msgA PUSCH in the CFRA. In this way, one PO may be selected for CFRA configuration from one msgA PUSCH configuration for CBRA that is selected from a set of msgA PUSCH configurations in the active BWP, in the case that the interlaced PUSCH is configured. It can be appreciated that the first configuration information may be predetermined or RRC configured.

In accordance with some exemplary embodiments, the interlaced msgA PUSCH configuration for CFRA may be implemented by utilizing or reusing the interlace configuration provided for PUSCH transmission with configured grant based scheduling. According to an exemplary embodiment, the interlaced msgA PUSCH configuration for CFRA may utilize or reuse one or more of the following parameters as described in section 6.1.2.3 of 3GPP TS 38.214 V16.0.0 for the case of configured UL grant Type 1:
    the parameter useInterlacePUSCH-Dedicated used for configured grant type 1 PUSCH transmission; and
    the parameter "frequency domain resource allocation".

As described in section 10.3 of 3GPP TS 38.300 V15.7.0, where the entire content of this technical specification is incorporated into the present disclosure by reference, the following two types of configured UL grants may be defined for configured grant scheduled PUSCH in a NR system:
    With Type 1, RRC directly provides the configured UL grant (including the periodicity).
    With Type 2, RRC defines the periodicity of the configured UL grant while physical downlink control channel (PDCCH) addressed to configured scheduling-radio network temporary identifier (CS-RNTI) can either signal and activate the configured UL grant (e.g., as described in section 5.8.2 of 3GPP TS 38.321 V15.7.0, where the entire content of this technical specification is incorporated into the present disclosure by reference), or deactivate it; i.e. a PDCCH addressed to CS-RNTI indicates that the UL grant can be implicitly reused according to the periodicity defined by RRC, until deactivated.

In accordance with some exemplary embodiments, the interlaced msgA PUSCH configuration for CFRA may be provided in a handover command message, a beam failure recover message, a PDCCH order which may be related to the random access with two-step CFRA, and/or any other possible signaling/messages (e.g., various physical layer signaling, higher layer signaling such as RRC signaling, etc.).

It can be realized that signaling, messages, parameters, variables and settings related to the interlace configuration for msgA PUSCH in CFRA described herein are just examples. Other suitable signaling transmissions, parameter settings, the associated configurations and the specific values thereof may also be applicable to implement the proposed methods.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 3:
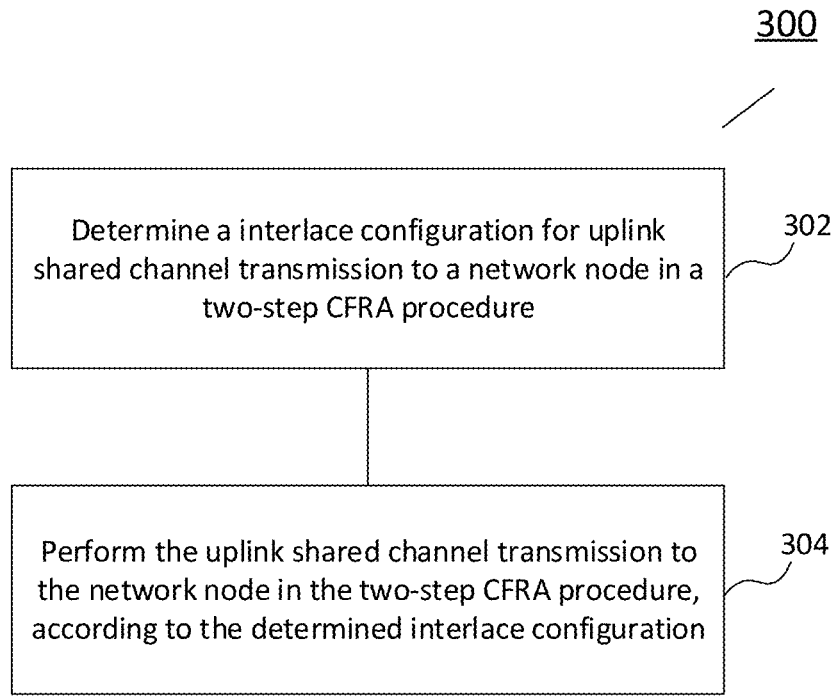
FIG. 3 is a flowchart illustrating a method according to some embodiments of the present disclosure.

FIG. 3 is a flowchart illustrating a method 300 according to some embodiments of the present disclosure. The method 300 illustrated in FIG. 3 may be performed by a terminal device or an apparatus communicatively coupled to the terminal device. In accordance with an exemplary embodiment, the terminal device such as a UE may be configured to connect to a network node such as a gNB, for example, by performing a RA procedure (e.g., a two-step CFRA procedure).

According to the exemplary method 300 illustrated in FIG. 3, the terminal device may determine a interlace configuration for uplink shared channel transmission to a network node in a two-step CFRA procedure, as shown in block 302. The uplink shared channel transmission may comprise msgA PUSCH transmission from the terminal device to the network node. In accordance with some exemplary embodiments, the interlace configuration may indicate to enable or disable interlaced resource allocation for the uplink shared channel transmission from the terminal device to the network node in the two-step CFRA procedure. The interlace configuration may also indicate how to implement the interlaced resource allocation for the uplink shared channel transmission of the terminal device. According to the determined interlace configuration, the terminal device may perform the uplink shared channel transmission to the network node in the two-step CFRA procedure, as shown in block 304.

In accordance with some exemplary embodiments, the determination of the interlace configuration may be performed by the terminal device based at least in part on dedicated signaling (e.g., RACH-ConfigDedicated, etc.) for the two-step CFRA procedure from the network node.

In accordance with some exemplary embodiments, the dedicated signaling may include one or more of:
- a start interlace index for an interlace or a set of interlaces allocated for the uplink shared channel transmission (e.g., a specific parameter such as interlaceIndex-FirstInterlaceMsgAPUSCHCFRA, etc.);
- a number of consecutive interlaces allocated for the uplink shared channel transmission (e.g., another specific parameter such as nrofInterlacesMsgAPUSCHCFRA, etc.); and
- a dedicated flag indicating whether to enable interlaced resource allocation for the uplink shared channel transmission in the two-step CFRA procedure (e.g., the dedicated interlace on-off flag useInterlaceMsgA-PUSCH-Dedicated, etc.).

It can be appreciated that the dedicated flag may also be used to indicate whether to disable the interlaced resource allocation for the uplink shared channel transmission in the two-step CFRA procedure.

In accordance with some exemplary embodiments, the dedicated signaling may include a specific field with a number of bits to indicate frequency resource allocation for the uplink shared channel transmission in the two-step CFRA procedure. According to an exemplary embodiment, the number of bits may be related to the size of an initial or active UL BWP. For example, the specific field may be a $\lceil \log_2(N_{RB}^{UL,BWP}(N_{RB}^{UL,BWP}+1)/2) \rceil$ bit-field "PUSCH frequency resource allocation" provided in RACH-ConfigDedicated IE or other resource block assignment information element, where $N_{RB}^{UL,BWP}$ is the size of the initial or active UL BWP. According to another exemplary embodiment, the number of bits may be a fixed number (e.g., 12 bits or other suitable number of bits).

In accordance with some exemplary embodiments, the determination of the interlace configuration may be based at least in part on common signaling (e.g., useInterlace-PUSCH-Common, etc.) from the network node. The common signaling may indicate whether to enable interlaced resource allocation for the uplink shared channel transmission.

In accordance with some exemplary embodiments, the determination of the interlace configuration may be performed by the terminal device based at least in part on one or more of:
- first configuration information, which may be related to a interlace configuration for uplink shared channel transmission of the terminal device in a two-step CBRA procedure; and
- second configuration information, which may be related to a interlace configuration for uplink shared channel transmission of the terminal device with configured grant based scheduling.

According to an exemplary embodiment, the first configuration information may indicate which interlace configuration of msgA PUSCH for CBRA may be selected for msgA PUSCH in the two-step CFRA procedure. Alternatively or additionally, the first configuration information may indicate which PO configured for msgA PUSCH in CBRA may be selected for msgA PUSCH in the two-step CFRA procedure.

According to an exemplary embodiment, the second configuration information may comprise one or more parameters for the case of configured UL grant Type 1, e.g., the parameter useInterlacePUSCH-Dedicated used for configured grant type 1 PUSCH transmission, and/or the parameter "frequency domain resource allocation", etc.

According to an exemplary embodiment, the first configuration information may be indicated by RRC signaling and/or other higher layer signaling from the network node. According to another exemplary embodiment, the first configuration information may be predetermined. In this case, the terminal device may determine the interlace configuration for uplink shared channel transmission according to the predetermined interlace configuration indicated by the first configuration information.

In accordance with some exemplary embodiments, the determination of the interlace configuration may be performed by the terminal device based at least in part on one or more of the following messages from the network node: a handover command message, a beam failure recover message, and a downlink control channel order (e.g., a PDCCH order) for the two-step CFRA procedure.

Figure 4:
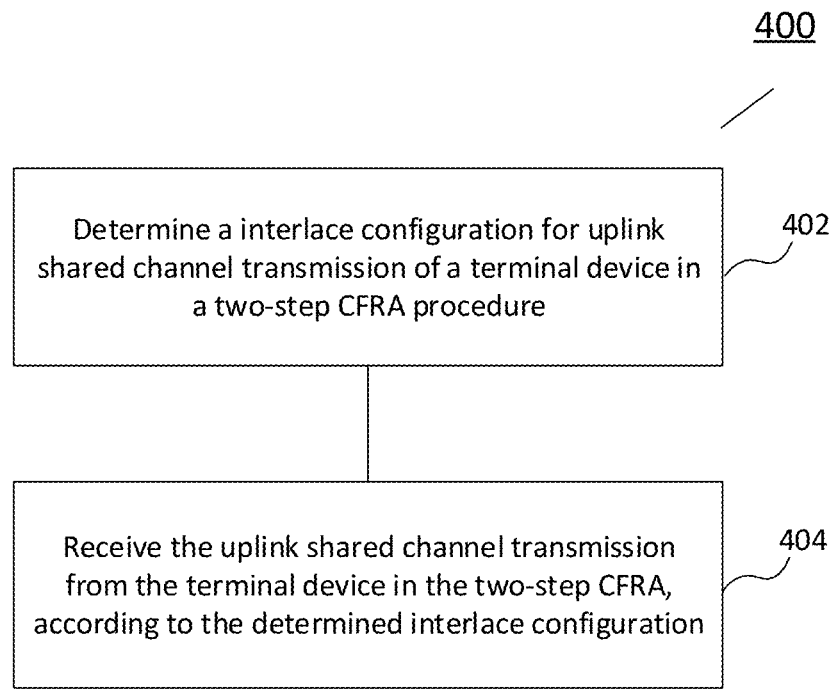
FIG. 4 is a flowchart illustrating another method according to some embodiments of the present disclosure.

FIG. 4 is a flowchart illustrating a method 400 according to some embodiments of the present disclosure. The method 400 illustrated in FIG. 4 may be performed by a network node or an apparatus communicatively coupled to the network node. In accordance with an exemplary embodiment, the network node may comprise a base station such as a gNB. The network node may be configured to communicate with one or more terminal devices such as UEs which can connect to the network node by performing a RA procedure (e.g., a two-step CFRA procedure).

According to the exemplary method 400 illustrated in FIG. 4, the network node may determine a interlace configuration for uplink shared channel transmission of a terminal device (e.g., the terminal device as described with respect to FIG. 3) in a two-step CFRA procedure, as shown in block 402. According to the determined interlace configuration, the network node may receive the uplink shared channel transmission from the terminal device in the two-step CFRA procedure, as shown in block 404.

It can be appreciated that the steps, operations and related configurations of the method 400 illustrated in FIG. 4 may correspond to the steps, operations and related configurations of the method 300 illustrated in FIG. 3. It also can be appreciated that the interlace configuration for uplink shared channel transmission as described with respect to FIG. 4 may correspond to the interlace configuration for uplink shared channel transmission as described with respect to FIG. 3. Thus, the interlace configuration determined by the terminal device as described with respect to the method 300 may have the same or similar contents and feature elements as the interlace configuration determined by the network node as described with respect to the method 400.

In accordance with some exemplary embodiments, the network node may transmit dedicated signaling (e.g., the dedicated signaling as described with respect to FIG. 3) to the terminal device to indicate the determined interlace configuration.

In accordance with some exemplary embodiments, the network node may transmit common signaling (e.g., the common signaling as described with respect to FIG. 3) to the terminal device to indicate whether to enable interlaced resource allocation for the uplink shared channel transmission.

In accordance with some exemplary embodiments, the determination of the interlace configuration may be performed by the network node based at least in part on first configuration information (e.g., the first configuration information as described with respect to FIG. 3), second configuration information (e.g., the second configuration information as described with respect to FIG. 3), and/or any other related information.

In accordance with some exemplary embodiments, the network node may transmit higher layer signaling (e.g., RRC signaling, etc.) to the terminal device to indicate the first configuration information. It can be appreciated that the first configuration information may be predetermined. In this case, the network node may not inform the terminal device of the first configuration information.

In accordance with some exemplary embodiments, the network node may indicate the determined interlace configuration to the terminal device in one or more of the following messages: a handover command message, a beam failure recover message, and a downlink control channel order (e.g., a PDCCH order, etc.) for the two-step CFRA procedure.

Various exemplary embodiments according to the present disclosure may enable interlaced resource allocation to be configured for msgA PUSCH in a two-step CFRA procedure. In accordance with some exemplary embodiments, a terminal device may determine the interlaced msgA PUSCH configuration in CFRA according to some flexible signaling which may be dynamically provided in a dedicated message from a network node. Alternatively or additionally, in order to reduce the signaling overhead, the interlaced msgA PUSCH configuration in CFRA may be implemented via reusing some of the existing parameters and/or signaling for interlace configuration. Application of various exemplary embodiments can improve configuration flexibility of interlaced msgA PUSCH in CFRA and enhance performance of a two-step CFRA procedure.

The various blocks shown in FIGS. 3-4 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 5:
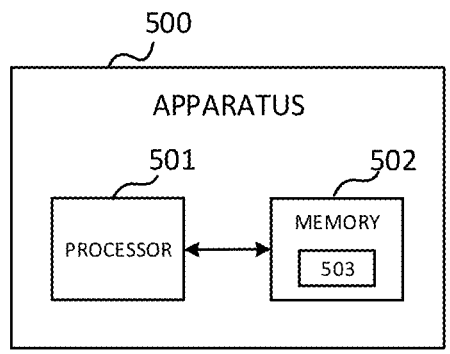
FIG. 5 is a block diagram illustrating an apparatus according to some embodiments of the present disclosure.

FIG. 5 is a block diagram illustrating an apparatus 500 according to various embodiments of the present disclosure. As shown in FIG. 5, the apparatus 500 may comprise one or more processors such as processor 501 and one or more memories such as memory 502 storing computer program codes 503. The memory 502 may be non-transitory machine/processor/computer readable storage medium. In accordance with some exemplary embodiments, the apparatus 500 may be implemented as an integrated circuit chip or module that can be plugged or installed into a terminal device as described with respect to FIG. 3, or a network node as described with respect to FIG. 4. In such case, the apparatus 500 may be implemented as a terminal device as described with respect to FIG. 3, or a network node as described with respect to FIG. 4.

In some implementations, the one or more memories 502 and the computer program codes 503 may be configured to, with the one or more processors 501, cause the apparatus 500 at least to perform any operation of the method as described in connection with FIG. 3. In other implementations, the one or more memories 502 and the computer program codes 503 may be configured to, with the one or more processors 501, cause the apparatus 500 at least to perform any operation of the method as described in connection with FIG. 4. Alternatively or additionally, the one or more memories 502 and the computer program codes 503 may be configured to, with the one or more processors 501, cause the apparatus 500 at least to perform more or less operations to implement the proposed methods according to the exemplary embodiments of the present disclosure.

Figure 6A:
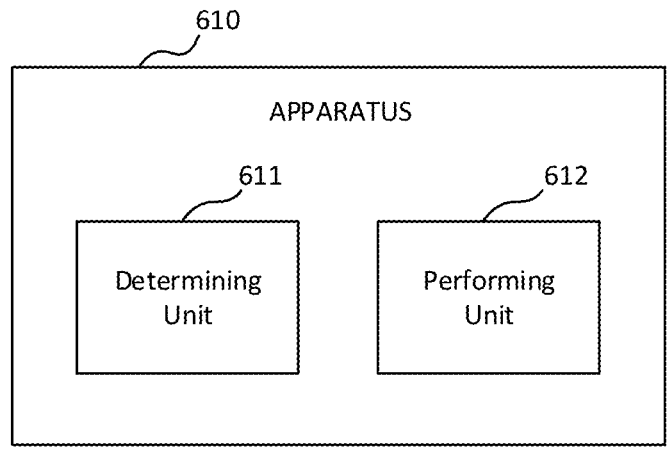
FIG. 6A is a block diagram illustrating another apparatus according to some embodiments of the present disclosure.

FIG. 6A is a block diagram illustrating an apparatus 610 according to some embodiments of the present disclosure. As shown in FIG. 6A, the apparatus 610 may comprise a determining unit 611 and a performing unit 612. In an exemplary embodiment, the apparatus 610 may be implemented in a terminal device such as a UE. The determining unit 611 may be operable to carry out the operation in block 302, and the performing unit 612 may be operable to carry out the operation in block 304. In an exemplary embodiment, the performing unit 612 may be implemented as a transmitting unit to carry out the operation in block 304. Optionally, the determining unit 611 and/or the performing unit 612 may be operable to carry out more or less operations to implement the proposed methods according to the exemplary embodiments of the present disclosure.

Figure 6B:
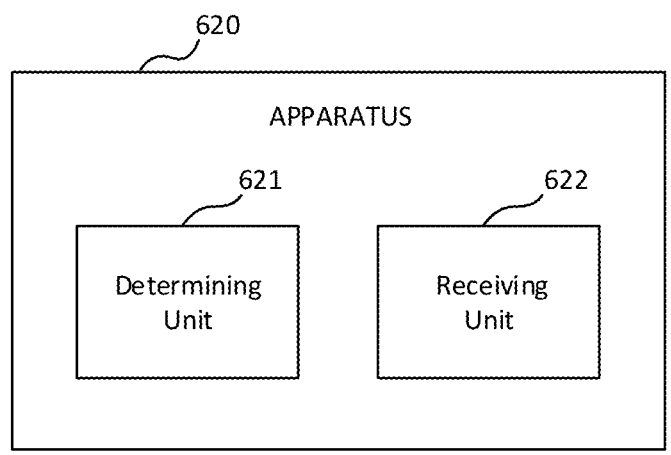
FIG. 6B is a block diagram illustrating a further apparatus according to some embodiments of the present disclosure.

FIG. 6B is a block diagram illustrating an apparatus 620 according to some embodiments of the present disclosure. As shown in FIG. 6B, the apparatus 620 may comprise a determining unit 621 and a receiving unit 622. In an exemplary embodiment, the apparatus 620 may be implemented in a network node such as a base station. The determining unit 621 may be operable to carry out the operation in block 402, and the receiving unit 622 may be operable to carry out the operation in block 404. Optionally, the determining unit 621 and/or the receiving unit 622 may be operable to carry out more or less operations to implement the proposed methods according to the exemplary embodiments of the present disclosure.

Figure 7:
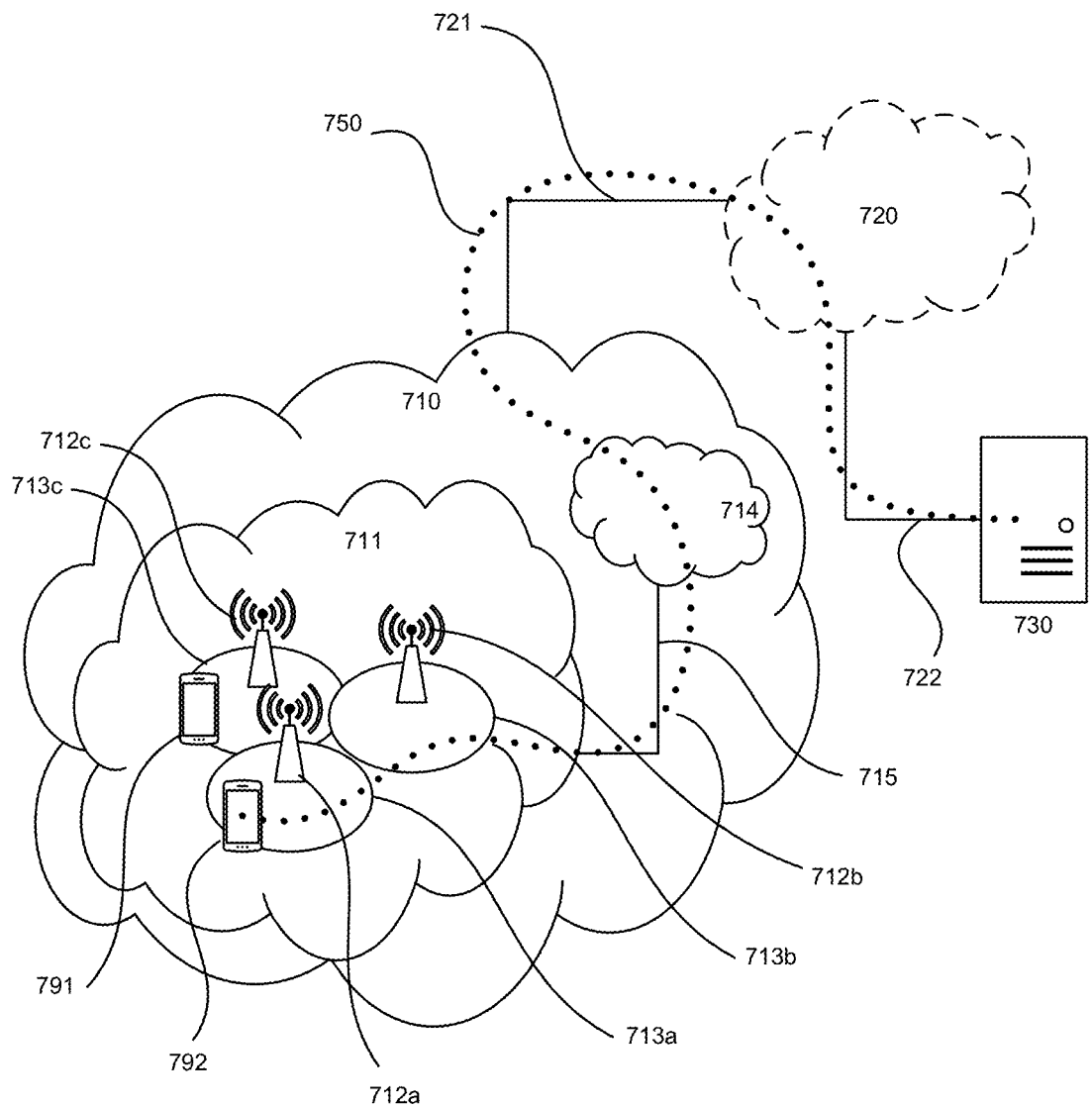
FIG. 7 is a block diagram illustrating a telecommunication network connected via an intermediate network to a host computer in accordance with some embodiments of the present disclosure.

FIG. 7 is a block diagram illustrating a telecommunication network connected via an intermediate network to a host computer in accordance with some embodiments of the present disclosure.

With reference to FIG. 7, in accordance with an embodiment, a communication system includes a telecommunication network 710, such as a 3GPP-type cellular network, which comprises an access network 711, such as a radio access network, and a core network 714. The access network 711 comprises a plurality of base stations 712*a*, 712*b*, 712*c*, such as NBs, eNBs, gNBs or other types of wireless access points, each defining a corresponding coverage area 713*a*, 713*b*, 713*c*. Each base station 712*a*, 712*b*, 712*c* is connectable to the core network 714 over a wired or wireless connection 715. A first UE 791 located in a coverage area 713*c* is configured to wirelessly connect to, or be paged by, the corresponding base station 712*c*. A second UE 792 in a coverage area 713*a* is wirelessly connectable to the corresponding base station 712*a*. While a plurality of UEs 791, 792 are illustrated in this example, the disclosed embodiments are equally applicable to a situation where a sole UE is in the coverage area or where a sole UE is connecting to the corresponding base station 712.

The telecommunication network 710 is itself connected to a host computer 730, which may be embodied in the hardware and/or software of a standalone server, a cloud-implemented server, a distributed server or as processing resources in a server farm. The host computer 730 may be under the ownership or control of a service provider, or may be operated by the service provider or on behalf of the service provider. Connections 721 and 722 between the telecommunication network 710 and the host computer 730 may extend directly from the core network 714 to the host computer 730 or may go via an optional intermediate network 720. An intermediate network 720 may be one of, or a combination of more than one of, a public, private or hosted network; the intermediate network 720, if any, may be a backbone network or the Internet; in particular, the intermediate network 720 may comprise two or more sub-networks (not shown).

The communication system of FIG. 7 as a whole enables connectivity between the connected UEs 791, 792 and the host computer 730. The connectivity may be described as an over-the-top (OTT) connection 750. The host computer 730 and the connected UEs 791, 792 are configured to communicate data and/or signaling via the OTT connection 750, using the access network 711, the core network 714, any intermediate network 720 and possible further infrastructure (not shown) as intermediaries. The OTT connection 750 may be transparent in the sense that the participating communication devices through which the OTT connection 750 passes are unaware of routing of uplink and downlink communications. For example, the base station 712 may not or need not be informed about the past routing of an incoming downlink communication with data originating from the host computer 730 to be forwarded (e.g., handed over) to a connected UE 791. Similarly, the base station 712 need not be aware of the future routing of an outgoing uplink communication originating from the UE 791 towards the host computer 730.

Figure 8:
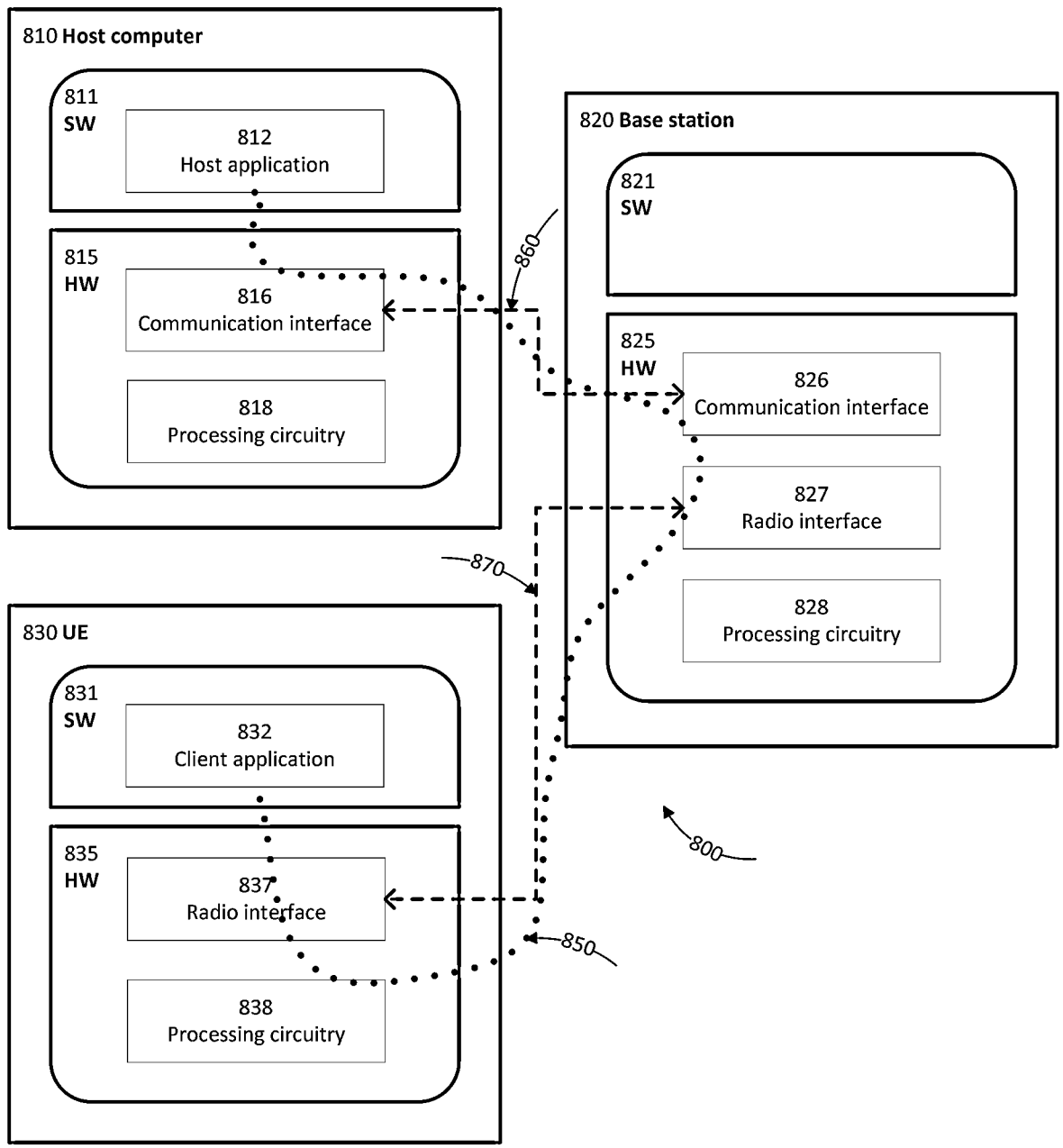
FIG. 8 is a block diagram illustrating a host computer communicating via a base station with a UE over a partially wireless connection in accordance with some embodiments of the present disclosure.

FIG. 8 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 8. In a communication system 800, a host computer 810 comprises hardware 815 including a communication interface 816 configured to set up and maintain a wired or wireless connection with an interface of a different communication device of the communication system 800. The host computer 810 further comprises a processing circuitry 818, which may have storage and/or processing capabilities. In particular, the processing circuitry 818 may comprise one or more programmable processors, application-specific integrated circuits, field programmable gate arrays or combinations of these (not shown) adapted to execute instructions. The host computer 810 further comprises software 811, which is stored in or accessible by the host computer 810 and executable by the processing circuitry 818. The software 811 includes a host application 812. The host application 812 may be operable to provide a service to a remote user, such as UE 830 connecting via an OTT connection 850 terminating at the UE 830 and the host computer 810. In providing the service to the remote user, the host application 812 may provide user data which is transmitted using the OTT connection 850.

The communication system 800 further includes a base station 820 provided in a telecommunication system and comprising hardware 825 enabling it to communicate with the host computer 810 and with the UE 830. The hardware 825 may include a communication interface 826 for setting up and maintaining a wired or wireless connection with an interface of a different communication device of the communication system 800, as well as a radio interface 827 for setting up and maintaining at least a wireless connection 870 with the UE 830 located in a coverage area (not shown in FIG. 8) served by the base station 820. The communication interface 826 may be configured to facilitate a connection 860 to the host computer 810. The connection 860 may be direct or it may pass through a core network (not shown in FIG. 8) of the telecommunication system and/or through one or more intermediate networks outside the telecommunication system. In the embodiment shown, the hardware 825 of the base station 820 further includes a processing circuitry 828, which may comprise one or more programmable processors, application-specific integrated circuits, field programmable gate arrays or combinations of these (not shown) adapted to execute instructions. The base station 820 further has software 821 stored internally or accessible via an external connection.

The communication system 800 further includes the UE 830 already referred to. Its hardware 835 may include a radio interface 837 configured to set up and maintain a wireless connection 870 with a base station serving a coverage area in which the UE 830 is currently located. The hardware 835 of the UE 830 further includes a processing circuitry 838, which may comprise one or more programmable processors, application-specific integrated circuits, field programmable gate arrays or combinations of these (not shown) adapted to execute instructions. The UE 830 further comprises software 831, which is stored in or accessible by the UE 830 and executable by the processing circuitry 838. The software 831 includes a client application 832. The client application 832 may be operable to provide a service to a human or non-human user via the UE 830, with the support of the host computer 810. In the host computer 810, an executing host application 812 may communicate with the executing client application 832 via the OTT connection 850 terminating at the UE 830 and the host computer 810. In providing the service to the user, the client application 832 may receive request data from the host application 812 and provide user data in response to the request data. The OTT connection 850 may transfer both the request data and the user data. The client application 832 may interact with the user to generate the user data that it provides.

It is noted that the host computer 810, the base station 820 and the UE 830 illustrated in FIG. 8 may be similar or identical to the host computer 730, one of base stations 712*a*, 712*b*, 712*c* and one of UEs 791, 792 of FIG. 7, respectively. This is to say, the inner workings of these entities may be as shown in FIG. 8 and independently, the surrounding network topology may be that of FIG. 7.

In FIG. 8, the OTT connection 850 has been drawn abstractly to illustrate the communication between the host computer 810 and the UE 830 via the base station 820, without explicit reference to any intermediary devices and the precise routing of messages via these devices. Network infrastructure may determine the routing, which it may be configured to hide from the UE 830 or from the service provider operating the host computer 810, or both. While the OTT connection 850 is active, the network infrastructure may further take decisions by which it dynamically changes the routing (e.g., on the basis of load balancing consideration or reconfiguration of the network).

Wireless connection 870 between the UE 830 and the base station 820 is in accordance with the teachings of the embodiments described throughout this disclosure. One or more of the various embodiments improve the performance of OTT services provided to the UE 830 using the OTT connection 850, in which the wireless connection 870 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 850 between the host computer 810 and the UE 830, in response to variations in the measurement results. The measurement procedure and/or the network functionality for reconfiguring the OTT connection 850 may be implemented in software 811 and hardware 815 of the host computer 810 or in software 831 and hardware 835 of the UE 830, or both. In embodiments, sensors (not shown) may be deployed in or in association with communication devices through which the OTT connection 850 passes; the sensors may participate in the measurement procedure by supplying values of the monitored quantities exemplified above, or supplying values of other physical quantities from which the software 811, 831 may compute or estimate the monitored quantities. The reconfiguring of the OTT connection 850 may include message format, retransmission settings, preferred routing etc.; the reconfiguring need not affect the base station 820, and it may be unknown or imperceptible to the base station 820. Such procedures and functionalities may be known and practiced in the art. In certain embodiments, measurements may involve proprietary UE signaling facilitating the host computer 810's measurements of throughput, propagation times, latency and the like. The measurements may be implemented in that the software 811 and 831 causes messages to be transmitted, in particular empty or 'dummy' messages, using the OTT connection 850 while it monitors propagation times, errors etc.

Figure 9:
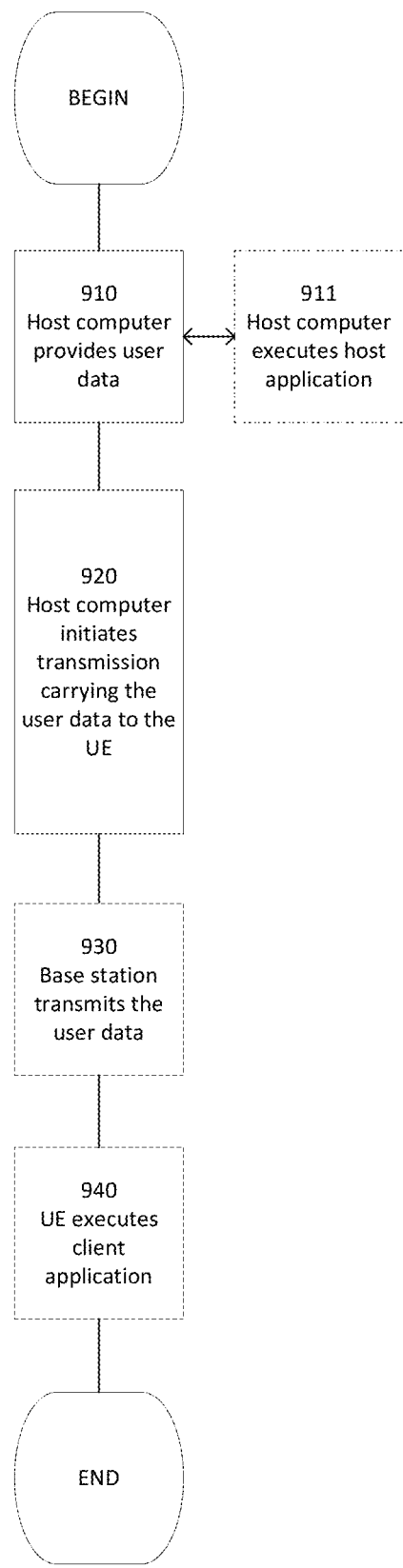
FIG. 9 is a flowchart illustrating a method implemented in a communication system, in accordance with an embodiment of the present disclosure.

FIG. 9 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 9 will be included in this section. In step 910, the host computer provides user data. In substep 911 (which may be optional) of step 910, the host computer provides the user data by executing a host application. In step 920, the host computer initiates a transmission carrying the user data to the UE. In step 930 (which may be optional), the base station transmits to the UE the user data which was carried in the transmission that the host computer initiated, in accordance with the teachings of the embodiments described throughout this disclosure. In step 940 (which may also be optional), the UE executes a client application associated with the host application executed by the host computer.

Figure 10:
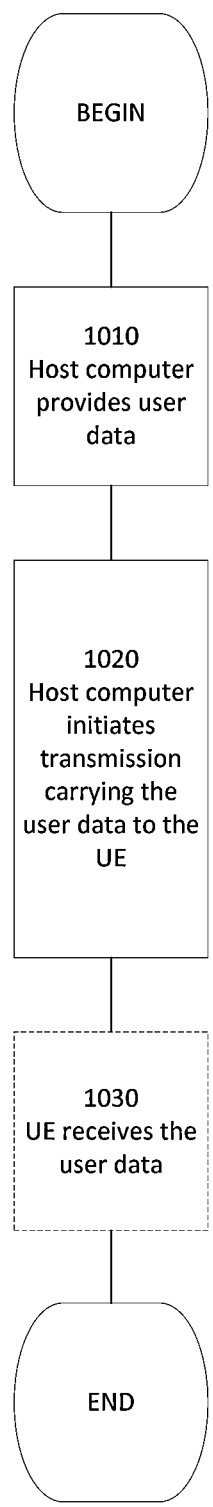
FIG. 10 is a flowchart illustrating a method implemented in a communication system, in accordance with an embodiment of the present disclosure.

FIG. 10 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 10 will be included in this section. In step 1010 of the method, the host computer provides user data. In an optional substep (not shown) the host computer provides the user data by executing a host application. In step 1020, the host computer initiates a transmission carrying the user data to the UE. The transmission may pass via the base station, in accordance with the teachings of the embodiments described throughout this disclosure. In step 1030 (which may be optional), the UE receives the user data carried in the transmission.

Figure 11:
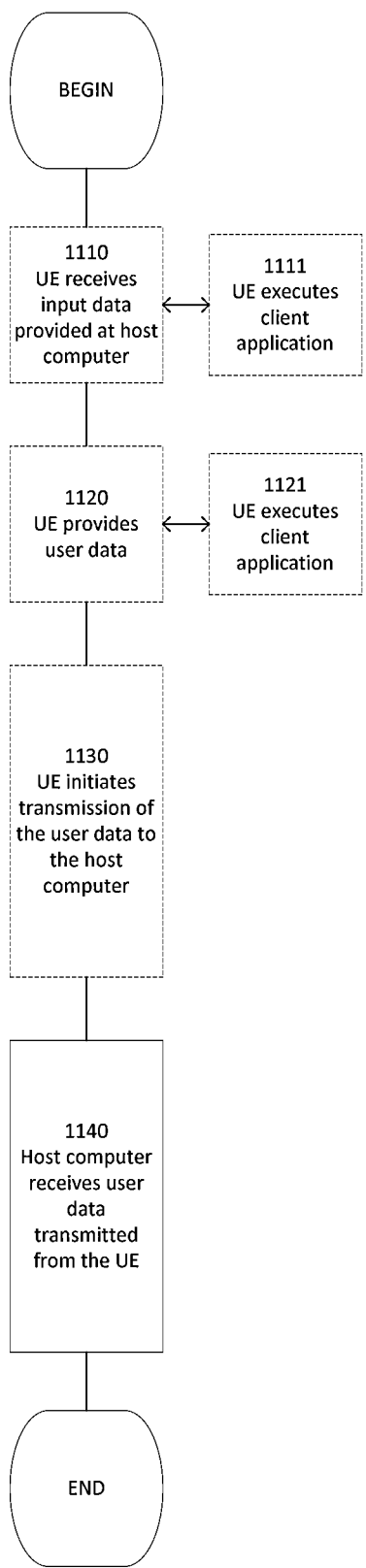
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 11 will be included in this section. In step 1110 (which may be optional), the UE receives input data provided by the host computer. Additionally or alternatively, in step 1120, the UE provides user data. In substep 1121 (which may be optional) of step 1120, the UE provides the user data by executing a client application. In substep 1111 (which may be optional) of step 1110, the UE executes a client application which provides the user data in reaction to the received input data provided by the host computer. In providing the user data, the executed client application may further consider user input received from the user. Regardless of the specific manner in which the user data was provided, the UE initiates, in substep 1130 (which may be optional), transmission of the user data to the host computer. In step 1140 of the method, the host computer receives the user data transmitted from the UE, in accordance with the teachings of the embodiments described throughout this disclosure.

Figure 12:
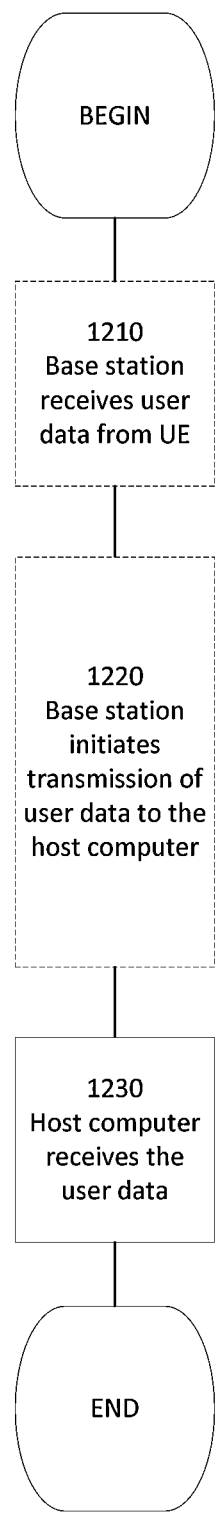
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 7 and FIG. 8. For simplicity of the present disclosure, only drawing references to FIG. 12 will be included in this section. In step 1210 (which may be optional), in accordance with the teachings of the embodiments described throughout this disclosure, the base station receives user data from the UE. In step 1220 (which may be optional), the base station initiates transmission of the received user data to the host computer. In step 1230 (which may be optional), the host computer receives the user data carried in the transmission initiated by the base station.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the exemplary method 400 as describe with respect to FIG. 4.

According to some exemplary embodiments, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the exemplary method 400 as describe with respect to FIG. 4.

According to some exemplary embodiments, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the exemplary method 300 as describe with respect to FIG. 3.

According to some exemplary embodiments, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the exemplary method 300 as describe with respect to FIG. 3.

According to some exemplary embodiments, there is provided a method implemented in a communication system which may include a host computer, a base station and a UE. The method may comprise, at the host computer, receiving user data transmitted to the base station from the UE which may perform any step of the exemplary method 300 as describe with respect to FIG. 3.

According to some exemplary embodiments, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the exemplary method 300 as describe with respect to FIG. 3.

According to some exemplary embodiments, there is provided a method implemented in a communication system which may include a host computer, a base station and a UE. The method may comprise, at the host computer, receiving, from the base station, user data originating from a transmission which the base station has received from the UE. The base station may perform any step of the exemplary method 400 as describe with respect to FIG. 4.

According to some exemplary embodiments, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the exemplary method 400 as describe with respect to FIG. 4.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, comprising:
    determining an interlace configuration for uplink shared channel transmission to a network node in a two-step contention-free random access procedure; and
    performing the uplink shared channel transmission to the network node in the two-step contention-free random access procedure, according to the determined interlace configuration;
    wherein the determination of the interlace configuration is based at least in part on dedicated signaling for the two-step contention-free random access procedure from the network node; wherein the dedicated signaling includes:
        a start interlace index for an interlace; and
        a number of consecutive interlaces allocated for the uplink shared channel transmission.

2. The method according to claim 1, wherein the determination of the interlace configuration is based at least in part on common signaling from the network node, and the common signaling indicates whether to enable interlaced resource allocation for the uplink shared channel transmission.

3. The method according to claim 1, wherein the determination of the interlace configuration is based at least in part on one or more of:
    first configuration information, which is related to a interlace configuration for uplink shared channel transmission of the terminal device in a two-step contention-based random access procedure; and
    second configuration information, which is related to an interlace configuration for uplink shared channel transmission of the terminal device with configured grant based scheduling.

4. The method according to claim 3, wherein the first configuration information is indicated by radio resource control signaling from the network node.

5. The method according to claim 4, wherein the first configuration information is predetermined.

6. The method according to claim 1, wherein the determination of the interlace configuration is based at least in part on one or more of the following messages from the network node:
    a handover command message;
    a beam failure recover message; and
    a downlink control channel order for the two-step contention-free random access procedure.

7. A method performed by a network node, comprising:
    determining an interlace configuration for uplink shared channel transmission of a terminal device in a two-step contention-free random access procedure; and
    receiving the uplink shared channel transmission from the terminal device in the two-step contention-free random access procedure, according to the determined interlace configuration;
    transmitting dedicated signaling to the terminal device to indicate the determined interlace configuration; wherein the dedicated signaling includes:
        a start interlace index for an interlace; and
        a number of consecutive interlaces allocated for the uplink shared channel transmission.

8. The method according to claim 7, further comprising:
    transmitting common signaling to the terminal device to indicate whether to enable interlaced resource allocation for the uplink shared channel transmission.

9. The method according to claim 8, wherein the determination of the interlace configuration is based at least in part on one or more of:
    first configuration information, which is related to an interlace configuration for uplink shared channel transmission of the terminal device in a two-step contention-based random access procedure; and
    second configuration information, which is related to a interlace configuration for uplink shared channel transmission of the terminal device with configured grant based scheduling.

10. The method according to claim 9, further comprising:
    transmitting radio resource control signaling to the terminal device to indicate the first configuration information.

11. The method according to claim 10, wherein the first configuration information is predetermined.

12. The method according to claim 11, further comprising indicating the determined interlace configuration to the terminal device in one or more of the following messages:
    a handover command message;
    a beam failure recover message; and
    a downlink control channel order for the two-step contention-free random access procedure.

13. A terminal device, comprising:
    one or more processors; and
    one or more memories comprising computer program codes,
    the one or more memories and the computer program codes configured to, with the one or more processors, cause the terminal device at least to:
        determine an interlace configuration for uplink shared channel transmission to a network node in a two-step contention-free random access procedure; and
        perform the uplink shared channel transmission to the network node in the two-step contention-free random access procedure, according to the determined interlace configuration; wherein the determination of the interlace configuration is based at least in part on dedicated signaling for the two-step contention-free random access procedure from the network node; wherein the dedicated signaling includes one or more of:
            a start interlace index for an interlace; and
            a number of consecutive interlaces allocated for the uplink shared channel transmission.

14. The terminal device according to claim 13, wherein the determination of the interlace configuration is based at least in part on common signaling from the network node, and the common signaling indicates whether to enable interlaced resource allocation for the uplink shared channel transmission.

15. The terminal device according to claim 13, wherein the determination of the interlace configuration is based at least in part on one or more of:
- first configuration information, which is related to an interlace configuration for uplink shared channel transmission of the terminal device in a two-step contention-based random access procedure; and
- second configuration information, which is related to a interlace configuration for uplink shared channel transmission of the terminal device with configured grant based scheduling.

16. The terminal device according to claim 15, wherein the first configuration is indicated by radio resource control signaling from the network node.

17. The terminal device according to claim 16, wherein the first configuration information is predetermined.

18. The terminal device according to claim 17, wherein the determination of the interlace configuration is based at least in part on one or more of the following messages from the network node:
- a handover command message;
- a beam failure recover message; and
- a downlink control channel order for the two-step contention-free random access procedure.

19. The terminal device according to claim 13, wherein the dedicated signaling includes a specific field with a number of bits to indicate frequency resource allocation for the uplink shared channel transmission in the two-step contention-free random access procedure.

20. The terminal device according to claim 19, wherein the number of bits is related to a size of an active uplink bandwidth part.

\* \* \* \* \*